(12) United States Patent
Koike et al.

(10) Patent No.: US 8,182,902 B2
(45) Date of Patent: May 22, 2012

(54) LABELED IN-MOLD SHAPED ARTICLE, AND IN-MOLD LABEL

(75) Inventors: Hiroshi Koike, Ibaraki (JP); Seiichiro Iida, Ibaraki (JP); Masaaki Yamanaka, Ibaraki (JP)

(73) Assignee: Yupo Corporation, Tokyo (JP)

( * ) Notice: Subject to any disclaimer, the term of this patent is extended or adjusted under 35 U.S.C. 154(b) by 763 days.

(21) Appl. No.: 11/719,702

(22) PCT Filed: Nov. 18, 2005

(86) PCT No.: PCT/JP2005/021297
§ 371 (c)(1),
(2), (4) Date: Nov. 14, 2007

(87) PCT Pub. No.: WO2006/054725
PCT Pub. Date: May 26, 2006

(65) Prior Publication Data
US 2008/0118718 A1 May 22, 2008

(30) Foreign Application Priority Data

Nov. 18, 2004 (JP) .................................. 2004-334963
Nov. 18, 2004 (JP) .................................. 2004-334964

(51) Int. Cl.
*B41M 5/00* (2006.01)
*B44C 1/17* (2006.01)
*G03G 7/00* (2006.01)

(52) U.S. Cl. ...................... 428/195.1; 428/200; 428/218; 428/347; 428/354; 428/500; 428/913

(58) Field of Classification Search ............... 428/195.1, 428/200, 218, 347, 354, 500, 913
See application file for complete search history.

(56) References Cited

U.S. PATENT DOCUMENTS

| | | | |
|---|---|---|---|
| 6,068,733 A * | 5/2000 | Storbeck et al. | 428/32.18 |
| 2001/0028952 A1 * | 10/2001 | Nishizawa et al. | 428/336 |
| 2003/0067099 A1 * | 4/2003 | Miller et al. | 264/447 |
| 2005/0058831 A1 | 3/2005 | Nishizawa et al. | |
| 2005/0186371 A1 * | 8/2005 | Kimura et al. | 428/35.2 |

FOREIGN PATENT DOCUMENTS

| | | |
|---|---|---|
| JP | 6 55727 | 8/1994 |
| JP | 7 92913 | 4/1995 |
| JP | 10 105069 | 4/1998 |
| JP | 2001 92358 | 4/2001 |
| WO | WO 03/067561 A1 * | 8/2003 |

* cited by examiner

*Primary Examiner* — Betelhem Shewareged
(74) *Attorney, Agent, or Firm* — Oblon, Spivak, McClelland, Maier & Neustadt, L.L.P.

(57) ABSTRACT

A labeled in-mold shaped article in which an in-mold label having a thermoplastic resin-containing substrate layer and a heat-seal layer that contains a heat-seal resin and a water-soluble binder is stuck to a shaped article and in which the in-mold label does not peel off from the shaped article even when the labeled in-mold shaped article is dipped in water at 40° C. for 4 days. The labeled in-mold shaped article satisfies both label adhesiveness and delabelability.

24 Claims, 2 Drawing Sheets

(a)

(b)

(a)         (b)

LABELED IN-MOLD SHAPED ARTICLE, AND IN-MOLD LABEL

TECHNICAL FIELD

The present invention relates to a labeled in-mold shaped article, and to an in-mold label for use for its production. More concretely, the invention relates to an in-mold label (C) that comprises a thermoplastic resin-containing substrate layer (A) and a heat-seal layer (B), and to a labeled in-mold shaped article (E) that comprises the in-mold label (C) air-tightly stuck to a shaped article (D) and is excellent in the delabeling capability thereof under a specific condition.

BACKGROUND ART

Shaped articles of polyethylene, polypropylene, polyvinyl chloride, polyethylene terephthalate, polybutylene terephthalate, polyethylene naphthalate, polyamide, polycarbonate, polystyrene or the like are lightweight and strong against dropping and impact shock and, as compared with glass and ceramics, they are highly safe, and therefore, they are much used in various fields as packing containers. In particular, stretch blow-molded bottles of polyester resin such as typically polyethylene terephthalate are excellent in their transparency, surface glossiness, chemical resistance and inner pressure resistance, and therefore generally have properties advantageous for packing containers. Accordingly, they are much used in various fields of foods, detergents, etc.

Stretch blow molding comprises stretch-blowing preform inserted in a blow mold to give a stretch blow-molded article having a predetermined shape. In this, a label may be previously fitted inside the blow mold, and the label may be stuck to the surface of the stretch-blow molded article along with stretch blowing. This is in-mold labeling molding (for example, JP-A 2002-355886), and this is in fact much used in many aspects.

On the other hand, with the establishment of a law about promotion of separated collection and re-commodification for container packing (Container Packing Law for the Promotion of Utilization of Recycled Resources), recycling of shaped article is a social demand Accordingly, a technique of separating a label from a shaped article and recycling the shaped article has been proposed (for example, JP-UM-A 06-55727).

According to the technique, however, the label could not be completely stuck to the shaped article, and therefore the technique has a drawback in that the label may be spontaneously peeled off. When much paste is used for enhancing the adhesion, then the paste may remain on the shaped article after the label has been peeled off from the shaped article, and this is also defective in that the article could not be recycled.

DISCLOSURE OF THE INVENTION

According to the prior-art technique as above, it is impossible to satisfy both the strong adhesion of a label to a shaped article and the peelability of the label from the shaped article with no paste remaining on the peeled article (this is hereinafter expressed as "delabelability"). Accordingly, the present invention is to solve the problems with the prior-art technique and to provide a labeled in-mold shaped article that satisfies both the strong adhesion of the label to the shaped article and the delabelability of the article and is therefore recyclable. The invention is also to provide an in-mold label that enables the production of the shaped article.

We, the present inventors have assiduously studied and, as a result, have found that, when an in-mold label which has a heat-seal layer having a specific constitution and function or has the heat-seal layer and a print layer is used in in-mold production, then a labeled in-mold shaped article having the desired properties can be provided, and have completed the present invention.

Accordingly, the invention provides a labeled in-mold shaped article (E) in which an in-mold label (C) having a thermoplastic resin-containing substrate layer (A) and a heat-seal layer (B) that contains a heat-seal resin and a water-soluble binder is stuck to a shaped article (D) and in which the in-mold label (C) does not peel off from the shaped article (D) even when the labeled in-mold shaped article (E) is dipped in water at 40° C. for 4 days. The invention also provides the in-mold label (C).

The in-mold label (C) of the invention may be an in-mold label (C) having the thermoplastic resin-containing substrate layer (A) the heat-seal layer (B) and a print layer (F) in that order. In this, the print area of the print layer (7) may be from 1 to 90% of the whole label, preferably from 5 to 80%.

Preferably, the labeled in-mold shaped article (E) of the invention is such that, when it is dipped in an aqueous 1.5 wt. % sodium hydroxide solution at 80° C. for 15 minutes, the in-mold label (C) peels off from the shaped article (D) and the heat-seal layer (B) does not remain on the shaped article (D).

Above all, preferably used is an in-mold label (C) having the thermoplastic resin-containing layer (A) and the heat-seal layer (B) that contains from 30 to 99% by weight of a thermoplastic resin having a melting point of from 50 to 120° C. and from 1 to 70% by weight of a water-soluble binder.

In the invention it is desirable that the density of the substrate layer (A) is from 0.40 to 0.98 g/cm$^3$ and the thermoplastic resin of the substrate layer (A) is a polyolefin. Also preferably, the heat-seal layer (B) is formed by applying a water-based coating composition that contains a heat-seal resin and a water-soluble binder onto the substrate layer (A) and drying it. Preferably, the water-soluble binder is a cationic water-soluble binder. Preferably, the shaped article (D) is formed of polyethylene, polypropylene, polyvinyl chlorides polyethylene terephthalate, polybutylene terephthalate, polyethylene naphthalate, polyamide or polystyrene, and is shaped in a mode of injection molding, direct blow moldings injection blow moldings stretch blow moldings thermoforming or compression molding.

BEST MODE FOR CARRYING OUT THE INVENTION

The labeled in-mold shaped article and the in-mold label of the invention are described in detail hereinunder. In this descriptions the numerical range expressed by the wording "a number to another number" means the range that falls between the former number indicating the lowermost limit of the range and the latter number indicating the uppermost limit thereof.

The in-mold label (C) of the invention has a thermoplastic resin-containing substrate layer (A) and a heat-seal resin (B) that contains a heat-seal resin and a water-soluble binder. An example of a typical structure of the in-mold label (C) of the invention is shown in FIG. 1.

Another embodiment of the in-mold label (C) of the invention as a thermoplastic resin-containing substrate layer (A), a heat-seal resin (B) and a print layer (F). An example of the structure of the in-mold label (C) of the other embodiment of the invention is shown in FIG. 2.

The labeled in-mold shaped article (E) of the invention has a structure where the in-mold label (C) is stuck to a shaped article (D) during in-mold production of the article.

[Substrate Layer (A)]

The substrate layer (A) in the invention is a layer containing a thermoplastic resin, and this is a layer to be a support for the in-mold label (C). Containing a thermoplastic resin, the in-mold label (C) may have excellent waterproofness and stability.

[Material]

Not specifically defined, the material of the substrate layer (A) in the invention may be any one that contains a thermoplastic resin and has good waterproofness. Examples of the thermoplastic resin to be in the substrate layer (A) are polyolefin resins such as high-density polyethylene, middle-density polyethylene, low-density polyethylene, propylene resin, polymethyl-1-pentene; functional group-containing polyolefin resins such as ethylene/vinyl acetate copolymer, ethylene/acrylic acid copolymer, maleic acid-modified polyethylene, maleic acid-modified polypropylene polyamide resins such as nylon-6, nylon 6,6; thermoplastic polyester resins such as polyethylene terephthalate and its copolymer, polybutylene terephthalate, aliphatic polyester; polycarbonate, atactic polystyrene, syndiotactic polystyrene. Of those thermoplastic resins, preferred for use herein are polyolefin resins as their workability is good.

More concrete examples of polyolefin resins are homopolymers of olefins such as ethylene, propylene, butylene, butadiene, isoprene, chloroprene, methyl-1-pentene; copolymers of two or more of these olefins; and copolymers with a functional group-containing monomer such as styrene, α-methylstyrene, vinyl acetate, vinyl alcohol, acrylic acid derivative, vinyl ether.

Of those polyolefin resins, more preferred are propylene resins in view of their chemical resistance and cost. Preferably, the propylenic resin comprises, as the essential ingredient thereof, a propylene homopolymer, polypropylene, or a propylene-based copolymer with an α-olefin such as ethylene, 1-butene, 1-hexene, 1-heptane or 4-methyl-1-pentene, having isotactic or syndiotactic or other various stereospecificity. The copolymer may be a binary, ternary or higher polynary copolymer, or may be a random or block copolymer. Preferably, the propylene resin contains a resin having a melting point lower than that of the propylene homopolymer, in an amount of from 2 to 25% by weight. Examples of the resin having a low melting point are high-density or low density polyethylene.

If desired, the substrate layer (A) may contain an inorganic fine powder, an organic filler, a stabilizer, a light stabilizer, a dispersant, a lubricant and the like optionally added thereto. When an inorganic fine powder is added thereto, its particle size is generally from 0.01 to 15 µm, preferably from 0.01 to 5 µm. Concretely, it includes calcium carbonate, calcined clay, silica, diatomaceous earth, white clay, talc, titanium oxide, barium sulfate, alumina, zeolite, mica, sericite, bentonite, sepiolite, vermiculite, dolomite, wollastonite, glass fibers, etc. When such an inorganic fine powder is used, then its surface is preferably pre-treated for hydrophilication and/or oleophilication. The surface treatment may improve the dispersibility of the powder and may impart various capabilities such as printability, coatability, rubbing resistance, labelability and secondary workability, to the substrate layer (A). Any known agent may be used for the surface treatment. Concretely, when an organic filler is added to the layer, then a resin is preferably selected that differs from the essential ingredient, thermoplastic resin. For example, when the thermoplastic resin film is a polyolefin resin film, then the organic filler may be a polymer such as polyethylene terephthalate, polybutylene terephthalate, polycarbonate, nylon-6, nylon-6,6, polycyclic olefin, polystyrene or polymethacrylate that has a melting point (e.g., 170 to 300° C.) or a glass transition temperature (e.g., 170 to 280° C.) higher than the melting point of the polyolefin resin and is incompatible with the polyolefin resin.

(Shaping)

The material may be formed into a film to be the substrate layer (A) in the invention. In forming the substrate layer (A), employable is a cast molding method where a resin melt is sheetwise cast through a single-layered or multi-layered T-die or I-die connected to a screw-type extruder; an inflation molding method where a resin melt is tubewise extruded out through a circular die and inflated by the inner air pressure given thereto; or a calendar molding or roll molding method where a kneaded material is rolled and worked into a sheet by the use of plural hot rolls.

(Lamination)

The substrate layer (A) may be laminated according to various known methods. Examples of the methods are a multi-layer die method using a feed block or a multi-manifold; and an extrusion lamination method using plural dies. The multi-layer die method and the extrusion lamination method may be combined.

(Stretching)

The substrate layer (A) may be stretched according to various methods generally employed in the art.

The stretching temperature may be within a known temperature range of from the glass transition temperature of the thermoplastic resin essentially used in the substrate layer (A) to the melting point of the crystal part thereof, suitable to stretching of the thermoplastic resin. Concretely, when the thermoplastic resin of the substrate layer (A) is a propylene homopolymer (melting point, 155 to 167° C.), then the temperature may be from 100 to 166° C.; and when the resin is high-density polyethylene (melting point, 121 to 136° C.), then the temperature may be from 70 to 135° C.; or that is, the temperature may be lower by from 1 to 70° C. than the melting point of the resin. Preferably, the stretching speed is from 20 to 350 m/sec.

The stretching method is described. A cast-molded film may be stretched in a mode of machine-direction stretching to be attained by utilizing the peripheral speed difference between plural rolls; or in a mode of cross-direction stretching to be attained by the use of a tenter oven; or in a mode of rolling; or in a mode of simultaneous biaxial stretching to be attained by a combination of a tenter oven and a linear motor. An inflation-molded film may be stretched through simultaneous biaxial stretching according to a tubular method.

Not specifically defined, the stretching draw ratio may be suitably determined in consideration of the properties of the thermoplastic resin to be used in the substrate layer (A). For example, when a propylene homopolymer or copolymer is used as the thermoplastic resin and when the resin film is stretched in one directions the draw ratio may be generally from about 1.2 to 12 times preferably from 2 to 10 times. When it is biaxially stretched, the draw ratio by area may be generally from 1.5 to 60 times, preferably from 4 to 50 times. When the other thermoplastic resin is used and when the resin film is stretched in one direction, the draw ratio may be generally from about 1.2 to 10 times, preferably from 2 to 5 times. When it is biaxially stretched, the draw ratio by area may be generally from 1.5 to 20 times, preferably from 4 to 12 times.

Thus obtained, the laminate film may have many fine pores inside the film, having a porosity, as calculated according to the following formula (1), of generally from 5 to 60%, preferably from 10 to 45%. Having the pores, the stretched film may be more flexible as compared with a stretched film not having pores therein.

$$\text{Porosity (\%)} = [(\rho 0 - \rho)/\rho 0] \times 100 \quad (1)$$

(In the formula, ρ0 is the true density of the film, and ρ is the density thereof.)

So far as the unstretched material does not contain much air, the true density may be nearly equal to the density of the unstretched film.

Having the pores formed therein, the density of the substrate layer (A) may lower and therefore the in-mold label (C) may be readily separated from the labeled in-mold shaped article (E) in a mode of specific gravity-based separation and the in-mold shaped article may be readily recycled. The density of the substrate layer (A) in the invention is preferably from 0.40 to 0.98 g/cm$^3$, more preferably from 0.50 to 0.96 g/cm$^3$, even more preferably from 0.60 to 0.96 g/cm$^3$. When the density of the substrate layer (A) is at most 0.98 g/cm$^3$, then specific gravity-based label separation in water may be easy; and when the density is at least 0.40 g/cm$^3$, then the strength of the in-mold label (C) may be enough.

The thickness of the substrate layer (A) may be generally from 10 to 500 μm, preferably from 20 to 300 μm. When the thickness is at least 10 μm, then the film may be tough in printing thereon or in working it into labels and its workability is good, and in addition, the labeling aptitude of the film for labels may be good. When the thickness of the layer is at most 500 μm, then the overall thickness of the in-mold label (C) may be suitable and the layer does not have any influence on the shape of the labeled in-mold shaped article (E).

Preferably, the substrate layer (A) is stretched at least monoaxially. It may have a two-layered structure or a three-layered or more multi-layered structure. Regarding its stretching frequency, the multi-layered structure may be stretched, for example, monoaxially/monoaxially, monoaxially/biaxially, biaxially/monoaxially, monoaxially/monoaxially/biaxially, monoaxially/biaxially/monoaxially, biaxially/monoaxially/monoaxially, monoaxially/biaxially/biaxially, biaxially/biaxially/monoaxially, or biaxially/biaxially/biaxially. Having the multi-layered structure, the substrate layer (A) may have various additional functions imparted thereto, such as printability, coatability, rubbing resistance, labelability and secondary workability.

[Heat-Seal Layer (B)]

In the invention, the heat-seal layer (B) may be formed on the substrate layer (A) in a mode of coating, etc. As containing a heat-seal resin and a water-soluble binder, the heat-seal layer (B) in the invention may have excellent waterproofness, and when processed with a predetermined, aqueous alkaline solution or the like, then the heat-seal layer (B) may be selectively peeled from the shaped article (D) along with the substrate (A) stuck thereto.

The water-soluble binder usable in the heat-seal layer (B) is described in detail in "Newest Technical Trend and Industrial Application of Water-soluble/Water-dispersible Polymer Materials" (published by Nippon Scientific information), and the binders mentioned below may be used in the invention.

Usable are natural substance-derived binders such as starch, modified starch, carboxymethyl cellulose, hydroxyethyl cellulose, hydroxypropyl cellulose, gelatin, pullulan, alginic acid, guar gum, locust bean gum, xanthane gum, pectin, carrageenan, gum arabic, gum ghatti, Kuraya gum, tragacanth gum, Psyllium sead gums soybean polysaccharides, tamarind seed gum tara gum, agar, furcelleran, glucomannan, microcrystalline cellulose, welan gum, curdlane, gellan gum, dextran, xanthane gums chitin, chitosan.

Also usable are binders that are produced through chemical synthesis, such as polyvinyl alcohol, polyacrylic acid-based polymer, ethyleneimine-based polymer, polyethylene oxide, polyacrylamide, polystyrenesulfonate, polyamidine, isoprene-based sulfonic acid-based polymer, polyethylene derivative, polyvinylpyrrolidone-based copolymer, polyvinylacetamide, polydioxosilane, polyvinylphenol, polyglycerin, polymaleic acid-based copolymer, polyitaconic acid-based copolymer, sodium 2-acrylamino-2-methylpropanesulfonate-based copolymer, naphthalenesulfonic acid condensate, ammonium polystyrenesulfonate, (meth)acryloyloxyethyltrimethylammonium chloride, polydiallyldimethylammonium chloride, dicyandiamide condensate, epichlo-dimethylamine condensate, dimethylamine-ethylene chloride condensate, aminomethyl-based polyacrylamide, polyvinylamine, polyacrylic acid hydrazide, polyvinylimidazoline, polyvinylbenzyltrimethylammonium chloride, polyvinylacetamide-vinylamine copolymer.

The above-mentioned water-soluble binder may be grouped into a nonionic water-soluble binder and an ionic binder, depending on the type of the hydrophilic group therein; and the ionic water-soluble binder may be further grouped into a cationic, anionic or ampholytic binder. For maintaining the adhesiveness of the substrate layer (A) in the invention, an ionic water-soluble binder is preferably used. In particular, when the substrate layer (A) contains a polyolefin resin, a cationic water-soluble binder is more preferred as the adhesiveness of the substrate layer (A) may be better.

Among the above-exemplified water-soluble polymers, examples of the cationic water-soluble binder are ethyleneimine-based polymer, polyacrylamide, polyvinylacetamide, (meth)acryloyloxyethyltrimethylammonium chlorides polydiallyldimethylammonium chloride, dicyandiamide-based condensate, epichlo-dimethylamine condensates dimethylamine-ethylene chloride condensate, aminomethyl-based polyacrylamide, polyvinylamine, polyacrylic acid hydrazide, polyvinylimidazoline, polyvinylbenzyltrimethylammonium chloride, polyvinylacetamide-vinylamine copolymer.

Of those cationic water-soluble polymers, preferred is ethyleneimine-based polymer.

The heat-seal layer (B) in the invention contains a heat-seal resin. The heat-seal resin is preferably a thermoplastic resin. In practical uses especially preferred is a thermoplastic resin having a melting point of from 50 to 120° C.; and more preferred is a thermoplastic resin having a melting point of from 60 to 110° C. The resin having a melting point of at least 50° C. may be more effectively prevent the labels from blocking together owing to their stickiness; and the resin having a melting point of at most 120° C. may readily enhance the label adhesiveness to the shaped article (E).

The heat-seal resin usable in the heat-seal layer (B) includes, for example, acrylic polymers vinyl acetate-based polymer, styrene-based polymer, vinyl chloride-based polymer, vinylidene chloride-based polymer, polyethylene, polyurethane, polyester, epoxy resin, petroleum resin, rosin ester, silicone resin, alkyd resin, polybutadiene, butadiene copolymer, polybutene, butyl rubber, polypropylene, polychloroprene, polyisoprene. Of those, preferred are acrylic polymer, vinyl acetate-based polymer, styrene-based polymer; and their more concrete examples are ethylene-acrylic acid copolymer, ethylene-methacrylic acid copolymer, ethylene-acrylate copolymer, acrylate polymer, ethylene-vinyl acetate copolymer, styrene-butadiene copolymer.

The ratio of the heat-seal resin to the water-soluble binder in the heat-seal layer (B) in the invention a preferably such that the heat-seal resin accounts for from 30 to 99% by weight and the water-soluble binder accounts for from 1 to 70% by weight; more preferably the heat-seal resin accounts for from 50 to 99% by weight and the water-soluble binder accounts for from 1 to 50% by weight; even more preferably the heat-seal resin accounts for from 75 to 99% by weight and the water-soluble binder accounts for from 1 to 25% by weight. When the proportion of the water soluble binder is at most 70% by weight, then the label adhesiveness may be readily increased; and when it is at least 1% by weight, then the delabelability may be readily enhanced.

Since the heat-seal layer (B) contains a water-soluble binder, it is desirable that a water-based coating composition is prepared for the layer. Concretely, the following method is preferred: A water-based coating composition that comprises the constituent components for the layer is prepared, then applied onto the surface of the substrate layer (A) and dried to thereby form the heat-seal layer (B) thereon. From the view point of environmental protection, it is desirable to use a solvent-free, water-based coating composition. Accordingly, it is desirable that the heat-seal resin is prepared through emulsion polymerization or suspension polymerization, or is prepared from a water-based dispersion formed by mechanically grinding the resin in an extruder and then dispersing it in a water-based solvent.

For improving the waterproofness thereof, the heat-seal layer (B) preferably contains a crosslinking agent. Examples of the agent are epoxidated polyamide-polyamine, urea/formalin resin, melamine/formalin resin, dialdehyde starch, polyfunctional epoxy-based crosslinking agent, carbodiimide-based crosslinking agent, glyoxal, oxazoline-based crosslinking agent, borax, zirconium nitrate. Further if desired, an antiblocking agent, a lubricant, an antistatic agent, a dispersant, a thickener, a defoaming agent, a preservative, a UV absorbent, a CV stabilizer, an antioxidant, a surfactant, a water-based dye, a color pigment and others may be added to the layer.

Lamination of the substrate layer (A) and the heat-seal layer (B) may be attained according to a known coating method. Concretely, herein employable for it is a coating method of roll coating, blade coating, bar coating air knife coating, gravure coating, reverse coating/die coating, lip coating, spray coating, comma coating, size press coating or their combination.

The dry coating amount of the heat-seal layer (B) may be suitably determined depending on the substrate film used. In general, it is preferably from 0.05 to 30 g/m$^2$, more preferably from 0.1 to 20 g/m$^2$, even more preferably from 0.2 to 10 g/m$^2$.

When the dry coating amount is at least 0.05 g/m$^2$, then the label may exhibit a sufficient adhesion strength during in-mold production with it. When the dry coating amount is at most 30 g/m$^2$, then the melted heat-seal layer (B) does not run out from the label to adhere to the mold during in-mold production and therefore, even in continuous molding operation, the label trace does not remain on the mold to worsen the outward appearance of the labeled in-mold shaped article (E).

When the coating amount increases, then the layer could not be formed in one coating operation and may require repeated coating for plural times, therefore causing a problem in that the production cost may increase.

[Print Layer (F)]

If desired, the in-mold label (C) of the invention may have a print layer (F) formed on the outer surface of the heat-seal layer (B). Via the print layer (F), the in-mold label (C) may be stuck to a transparent shaped article (D), and the figures or the letters given to the print layer (F) could be seen through the shaped article (D) (FIG. 4). In this case, an in-mold shaped article (E) more excellent n point of its design latitude than before maybe obtained. For obtaining the in-mold label (C) of the type, employable is a method of forming the print layer (F) on the substrate layer (B) before forming the heat-seal layer (B). In this method, however, the label must be worked for heat-seal treatment every time after the printing operation, and the method is defective in that the working is troublesome and the quality of the heat-seal layer (B) could not be stable. Therefore, in the invention, the heat-seal layer (B) is first formed on the substrate layer (A), and then the print layer (F) is formed on the heat-seal layer (B). According to the invention, the adhesiveness of the in-mold label (C) to the shaped article (D) may be controlled depending on the percentage by area of the print layer (F), which therefore may facilitate the separation of the in-mold label (C) from the shaped article (D).

In the in-mold label (C) of the invention, the print layer (F) may be formed on the heat-seal layer (B). However, when the print layer is formed to a degree of more than 90% of the overall surface of the label, for example, on the entire surface of the heat-seal layer (B), then the label may lose sufficient adhesiveness to the shaped article (D). In addition, since the in-mold label (C) of the invention is preferably so designed that the figures and the letters of the print layer (F) could be seen through the shaped article (D), it is desirable that the print area of the print layer (F) is generally from 1 to 90%, preferably from 5 to 80%, more preferably from 5 to 70% of the entire surface of the label.

The print layer (F) may be formed according to a known method of offset printing, relief printing, gravure printing, flexographic printing, letterpress printing, inkjet recording, thermal recording, thermal transfer recording, electrophotographic recording, etc. Any ink described in detail in a known reference (Introduction to Printing ink, written by Jiro Alhara, published by the Printing Society of Japan, Publishing Section) is applicable to forming the print layer (F). Preferred are offset ink and flexographic ink of which the amount may be small in printing with it and which is excellent in point of its ability of color graduation. For drying the ink, preferred is a drying method of oxidative polymerization, thermal polymerization or photopolymerization as it produces excellent ink adhesion to the substrate. Concretely, preferred examples of offset ink are Toyo Ink MFG's TSP-400, and T & K Toka's Best-SP and BC-161; and those of flexographic ink are Kuboi Ink's UV-Ace, FX-1, and T & K Toka's Flexo PAC-MC and UV-Flexo CF.

[Other Printing]

If desired, the in-mold label (C) of the invention may be additionally printed on the surface of the substrate (A) (opposite to the face thereof to be laminated with the heat-seal layer (B)). For the printing, employable is the same method as that for the print layer (F). The surface may be decorated in any other known manner than printing, for example, through metal vapor deposition.

[Shaped Article (D)]

The in-mold label (C) of the invention may be stuck to the shaped article (D) of different material according to an in-mold production method. For example, it is applicable to shaped articles of polyethylene, polypropylene, polyvinyl chloride, polyethylene terephthalate, polybutylene terephthalate, polyethylene naphthalate, polyamide, polycarbonate, polystyrene, etc. Of those, preferred are polyethylene, polypropylene, polyethylene terephthalate. When the label is combined with polyethylene, polypropylene or the like having a high melting temperature, then it is favorable since the label may enjoy higher adhesiveness. When the label is combined with polyethylene terephthalate, polyethylene naphthalate, polystyrene or the like having a specific gravity larger than that of water, then it is also favorable since the label (C) may be readily separated from the shaped article (D) through specific gravity-based label separation.

Any known method may be employed in forming the shaped article (D). For example, it may be formed according to an injection-molding method where a resin melt is cast into a mold; a direct-blow molding method where a resin melt is tubewise extruded out through a circular die and inflated in a mold while it is still in melt; an injection-blow molding method where a preform formed through injection molding (shaped article of small-size container) is suitably conditioned at the shaping temperature thereof and then inflated to the intended shape of the container; a stretch-blow molding method where a shaped preform of a container is inflated to the intended container shapes using a stretching rod and assisted with air pressure at a temperature lower than the melting point of the resin; a thermoforming method where a sheetwise-shaped resin is softened under heat and worked into an article having a shape of the mold used owing to differential pressure; or a compression molding method where a resin is melted in a mold and worked under pressure into an article having the shape of the mold.

The invention is applicable to any of these shaping methods, and in particular, its advantage is that the invention is applicable even to stretch blow molding through which conventional in-mold labels could not attain a sufficient adhesion power since the molding temperature is low.

[Adhesiveness of In-Mold Label]

In the labeled in-mold shaped article (E) of the inventions the adhesiveness of the in-mold label (C) to the shaped article (D) is high and the waterproofness thereof is high. Accordingly, even when the labeled in-mold shaped article (E) is deformed by hands the label (C) may well follow the shaped article (D) and is hardly peeled off from it. In addition, even when the labeled in-mold shaped article (E) is dipped in water at 40° C. for 4 days, the label (C) does not peel off from the shaped article (D) [for examples polyethylene terephthalate shaped article (D)]. "Does not peel off" as referred to herein is meant to include both a case where the label (C) does not peel off at all from the shaped article (D) and a case where it has peeled off partly but a major part thereof does not peel off (less than 50% of the whole area of the label (C) has peeled off but at least 50% thereof is still stuck to the shaped article (D)).

[Delabelability of In-Mold Label]

In the labeled in-mold shaped article (E) of the invention, the in-mold label (C) peels off from the shaped article (D) when dipped in hot water at higher than 40° C. The temperature of the hot water is preferably from 70 to 100° C., more preferably from 75 to 100° C., even more preferably from 80 to 95° C. It may be ordinary hot water or may be alkaline hot water. For peeling the label therein within a short period of time, alkaline hot water is preferably used. In case where alkaline hot water is used, it is preferably an aqueous 1.5 wt. % alkali solution as described in the self-imposed planning guideline by the Council for PET Bottle Recycling of Japan. When the in-mold label (C) is peeled off from the shaped article (D), the labeled in-mold shaped article (E) of the invention may be statically put in hot water or alkaline hot water, which, however may be stirred or in which the labeled in-mold shaped article (E) may be shaken. Hot water or alkaline hot water may be sprinkled intensively over the in-mold label (C). Further, the shaped article may be shaken in front and back while pressure is given to the in-mold label (C) thereof so as to shorten the peeling time. The labeled in-mold shaped article (E) of the invention is characterized in that the heat-seal layer (B) does not remain on the shaped article (D) after the label peeling operation.

EXAMPLES

The invention is described more concretely with reference to the following Examples, Comparative Examples and Test Examples. In these, the material used, its amount and the ratio, and the details of the treatment may be suitably modified or changed not overstepping the sprit and the scope of the invention. Accordingly, the scope of the invention should not be limited to the following Examples.

The resin compositions shown in Production Examples of the invention are listed in Table 1.

TABLE 1

| Designation of Material | Details |
|---|---|
| Thermoplastic resin composition (a) | Thermoplastic resin composition prepared by adding 20% by weight of calcium carbonate [Shiraishi Calcium's Softon 1800; mean particle size = 1.2 µm] to a mixture of 70% by weight of propylene homopolymer [Japan Polypropylene's Novatec PP: FY4; MFR (230° C., 2.16 kg load) = 5 g/10 min; melting point = 165° C.] and 10% by weight of high-density polyethylene [Japan Polyethylene's Novatec HD: HJ360; MFR (190° C., 2.16 kg load) = 5 g/10 min; melting point = 131° C.], and then kneading the resulting mixture in an extruder set at a temperature of 230° C. |
| Thermoplastic resin composition (b) | Thermoplastic resin composition prepared by adding 30% by weight of calcium carbonate [Shiraishi Calcium's Softon 1800; mean particle size = 1.2 µm] to 70% by weight of propylene homopolymer [Japan Polypropylene's Novatec PP: MA3; MFR (230° C., 2.16 kg load) = 11 g/10 min; melting point = 165° C.], and then kneading the resulting mixture in an extruder set at a temperature of 230° C. |
| Thermoplastic resin composition (c) | Thermoplastic resin composition prepared by adding 40% by weight of calcium carbonate [Shiraishi Calcium's Softon 1800; mean particle size = 1.2 µm] to 60% by weight of propylene homopolymer [Japan Polypropylene's Novatec PP: MA3; MFR (230° C., 2.16 kg load) = 11 g/10 min; melting point = 165° C.], and then kneading the resulting mixture in an extruder set at a temperature of 230° C. |
| Thermoplastic resin composition (d) | Thermoplastic resin composition prepared by adding 60% by weight of calcium carbonate that had been surface-treated with cationic polymer in Preparation Example 2 (mean particle size = 1.5 µm), to 40% by weight of propylene homopolymer [Japan Polypropylene's Novatec PP: MA3; MFR (230° C., 2.16 kg load) = 11 g/10 min; melting point = 165° C.], and then kneading the resulting mixture in an extruder set at a temperature of 230° C. |
| Thermoplastic resin composition (e) | Propylene homopolymer [Japan Polypropylene's Novatec PP: FY5; MFR (230° C., 2.16 kg load) = 3 g/10 min; melting point = 166° C.]. |

Preparation Example 1

Preparation of Surface-Treating Agent 500 parts by weight of diallylamine hydrochloride (aqueous solution having a concentration or 60% by weight), 13 parts by weight of acrylamide (aqueous solution having a concentration of 40% by weight) and 40 parts by weight of water were put into a reactor equipped with a reflux condenser, a thermometer, a dropping funnel, a stirrer and a gas-introducing duct, and heated up to an inner temperature of 80° C. with introducing nitrogen gas thereinto. With stirring, a polymerization initiator and 30 parts by weight of ammonium persulfate (aqueous solution having a concentration of 25% by weight) were dropwise added to it via the dropping funnel, taking 4 hours. After the addition, this was reacted for 1 hour to obtain a viscous pale yellow liquid. 50 g of it was taken out, and poured into 500 ml of acetone to produce a white precipitate. The precipitate was taken out through filtration, well washed twice with 100 ml of acetone, and then dried in vacuum to obtain a white solid polymer (water-soluble cationic copolymer). The obtained polymer had a weight-average molecular weight of 55,000 as determined through CPC (Gel Permeation Chromatography).

Preparation Example 2

Preparation of Surface-Treated Heavy Calcium Carbonate

40% by weight of heavy calcium carbonate (Nippon Cement's dry-ground powder having a mean particle size of 8 μm) and 60% by weight of water were fully stirred and mixed to give a slurry. The surface-treating agent prepared in Preparation Example 1 was added to it in an amount of 0.06 parts by weight relative to 100 parts by weight of heavy calcium carbonate. Using a table attritor-type medium stirring mill (glass beads having a diameter of 1.5 mm; filling factor 170%; peripheral speed 10 m/sec), this was wet-ground. Next, 50 parts of a mixture consisting essentially of sodium C14 alkanesulfonate and sodium C16 alkanesulfonate (aqueous solution having a concentration of 2% by weight) was added to it, and stirred. Next, this was classified through a 350-mesh screen, and the slurry having passed through the 350-mesh screen was dried with a medium-fluidized drier (Nara Machinery's MSD-200). The mean particle size of the obtained calcium carbonate was measured with Microtrack (by Nikkiso), and was 1.5 μm. This was used as a material for the thermoplastic resin composition (d) in Table 1.

Production Example 1

Production-1 of Substrate Layer A

The thermoplastic resin composition (a) was kneaded in an extruder set at 230° C., then fed to an extrusion die set at 250° C. and sheetwise extruded out through it. Then, this was cooled with a cooling device to obtain an unstretched sheet. The unstretched sheet was heated at 140° C., and stretched 4-fold in the machine direction. The thermoplastic resin composition (c) was kneaded in an extruder set at 250° C., then sheetwise extruded out, and laminated on the back surface of the above 4-fold-stretched film. Then, the thermoplastic resin composition (d) was kneaded in an extruder set at 250° C., and sheetwise extruded out to be laminated on the front surface of the above 4-fold-stretched film, thereby producing a three-layered laminate film. Next, the three-layered laminate film was cooled to 60° C., then again heated at about 140° C. using a tenter oven and stretched 10-fold in the cross direction, and thereafter this was annealed in a heat-setting zone conditioned at 160° C. Next, this was cooled to 60° C. and trimmed at its edges to obtain a three-layered [(d/a/c)=(30/40/30) μm; layer-stretching constitution (monoaxial biaxial-monoaxial)], white laminate film having an overall thickness of 100 μm and a density of 0.86 g/cm$^3$.

Production Example 2

Production-2 of Substrate Layer A

The thermoplastic resin composition (a) and the thermoplastic resin composition (b) were separately kneaded in different extruders both set at 230° C., then fed to one co-extrusion die set at 250° C. and sheetwise extruded out through it, as laminated in an order of b/a/b in the die. Then, this was cooled with a cooling device to obtain a three-layered unstretched sheet. The unstretched sheet was heated at 150° C., and stretched 5-fold in the machine direction. Next, this was cooled to 60° C., then again heated up to 150° C. and stretched 8-fold in the cross direction with a tenter, then annealed at 160° C. and cooled to 60°C. Next, this was subjected to corona discharge treatment, and trimmed at its edges to obtain a three-layered [(b/a/b)=(10/60/10) μm; layer-stretching constitution (biaxial/biaxial/biaxial)], white laminate film having an overall thickness of 80 μm and a density of 0.76 g/cm$^3$.

Production Example 3

Production-3 of Substrate Layer A

The thermoplastic resin composition (a) was kneaded in an extruder set at 230° C., then fed to an extrusion die set at 250° C. and sheetwise extruded out through it. Then, this was cooled with a cooling device to obtain an unstretched sheet. The unstretched sheet was subjected to corona discharge treatment, and trimmed at its edges to obtain a transparent film having a thickness of 100 μm and a density of 0.89 g/cm$^3$.

Production Example 4

Production-4 of Substrate Layer A

The thermoplastic resin composition (e) was kneaded in an extruder set at 230° C., then fed to an extrusion die set at 250° C. and sheetwise extruded out through it. Then, this was cooled with a cooling device to obtain an unstretched sheet. The unstretched sheet was heated at 150° C. and stretched 5-fold in the machine directions. The MD-stretched film was cooled to 60° C., then again heated at about 150° C. using a tenter oven and stretched 8-fold in the cross direction, and thereafter this was annealed in a heat-setting zone conditioned at 160° C. Next, this was cooled to 60° C. and trimmed at its edges to obtain a transparent film having a thickness of 80 μm and a density of 0.91 g/cm$^3$.

Examples 1 to 5, Comparative Examples 1 and 2

Production of In-Mold Label, and Labeled In-Mold Shaped Article

The heat-seal resin dispersion, the water-soluble binder, the paper strengthening agent, the antiblocking agent and water, as described in Table 2, were mixed to have the composition and the solid content concentration as in Table 3, thereby preparing a water-based coating composition (water-based coating agent). Using a slot-die coater driven at a line speed of 20 m/min, the water-based coating composition was applied on the front surface of the substrate layer (A) of Production Examples 1 to 4, as in Table 3, and then dried in an oven having a length of 10 m and set at a drying temperature of 80° C., thereby obtaining 7 types of in-mold label (C). After dried, the coating amount of the heat-seal layer (B) of each in-mold label (C) thus obtained herein was as in Table 3.

Examples 6 to 9, Comparative Example 3

Production of In-Mold Label, and Labeled in-Mold Shaped Article

The heat-seal layer (B) of the in-mold label (C) obtained in Examples 1 to 4 was printed through dot UV flexography under the printing condition mentioned below, as in FIG. 2, thereby obtaining 5 types of in-mold label (C). In Comparative Example 3, the label was solid-printed to have a printed surface area of 100%.

The surface area of the print layer (C) of the obtained in-mold label (C) was as in Table 3.

| Printer: | MA-830 (by Mark Andy) |
| Ink: | UV-Ace FX-1 Cyan (by Kuboi Ink) |
| Anilox roll: | 300 lines |
| Printing speed: | 30 m/min |
| UV dose | 80 W/m$^2$ |

TABLE 2

| Ingredient | | Details |
|---|---|---|
| Heat-Seal Resin | Dispersion (1) | Ethylene/methacrylic acid copolymer having a phase transition temperature of 90° C. and a mean particle size of 0.7 μm (by Chuo Rika Kogyo; trade name, Aquatex AC-3100; solid content concentration 45 wt. %) |
| | Dispersion (2) | Ethylene/vinyl acetate copolymer having a phase transition temperature of 70° C. and a mean particle size of 1.2 μm (by Chuo Rika Kogyo; trade name, Aquatex EC-4800; solid content concentration 40 wt. %) |
| | Dispersion (3) | Ethylene/vinyl acetate copolymer having a phase transition temperature of 80° C. and a mean particle size of 0.8 μm (by Chuo Rika Kogyo; trade name, Aquatex MC-3800; solid content concentration 40 wt. %) |
| Water-soluble binder (1) | | Cationic water-soluble binder, polyethyleneimine (by Nippon Shokubai; trade name, Epomin P-1000; solid content concentration, 30 wt. %) |
| Water-soluble binder (2) | | Cationic water-soluble binder, urea-modified polyethyleneimine (by BASF Japan; trade name, Polymin-SN; solid content concentration, 24 wt. %) |
| Paper strengthening agent | | Epoxidated polyamide-polyamine (by Seiko PMC; trade name, WS4002; solid content concentration, 12.5 wt. %) |
| Anti-blocking agent | | Wet-type calcium carbonate having a mean particle size of 0.7 μm (by Maruo Calcium; trade name, FC-40; solid content concentration, 70 wt. %) |

The In-mold label (C) obtained in Examples and Comparative Examples was blanked out to give a piece having a height of 70 mm and a width of 90 mm. As in FIG. 3, this was set in the mold (2) at 25° C. of a stretch-blow molding machine (by Yorkey; trade name, PET-2W Model) in such a manner that the label substrate layer surface (A-1) that is opposite to the heat-seal layer (B) of the in-mold label shown in FIGS. 1 and 2 could be kept in contact with the inner wall (2-a) of the mold (2), with degassing the mold through suction via the vacuum degassing suction hole (4), and fixed to the wall. Next, a preform (3, having a shape of small-size container) of polyethylene terephthalate (by Japan Unipet; trade name, Unipet RT543), which had been preformed with an injection-molding machine, was heated with an IR heater at 95° C., and then molded in a mode of stretch blow molding that takes a mold retention time of 10 seconds, thereby obtaining a cylindrical, labeled in-mold shaped article (E) having a height of 200 mm and a waist size of 210 mm.

Apart from it, the in-mold label (C) obtained in Examples and Comparative Examples was blanked out to give a piece having a height of 70 mm and a width of 90 mm. As in FIG. 4, this was set in the mold (12) at 25° C. of a molding machine for blow-molded bottles, in such a manner that the label substrate layer surface (A-1) that is opposite to the heat-seal layer (B) of the label could be kept in contact with the inner wall (12-a) of the mold (12), with degassing the mold through suction via the vacuum degassing suction hole (14), and fixed o the wall. Next, polypropylene (by Japan Polypropylene; trade name, EG8) heated and melted at 200° C. was molded in the machine in a mode of direct blow molding that takes a shot cycle of 12 seconds, thereby obtaining a labeled in-mold shaped article (E).

Further, the in-mold label (C) obtained in Examples and Comparative Examples was blanked out to give a piece having a height of 70 mm and a width of 90 mm. As in FIG. 4, this was set in the mold (12) at 15° C. of a molding machine for blow-molded bottles, in such a manner that the label substrate layer surface (A-1) that is opposite to the heat-seal layer (B) of the label could be kept in contact with the inner wall (12-a) of the mold (12), with degassing the mold through suction via the vacuum degassing suction hole (14), and fixed to the wall. Next, high-density polyethylene (by Japan Polyethylene; trade name, HB330) heated and melted at 180° C. was molded in the machine in a mode of direct blow molding that takes a shot cycle of 18 seconds, thereby obtaining a labeled in-mold shaped article (E).

Test Examples

Thus obtained, the labeled in-mold shaped articles (E) were tested and assessed for their adhesiveness, waterproof adhesiveness and delabelability, in the manner mentioned below.

(1) Adhesiveness:

The labeled in-mold shaped article (E) is deformed by hand, and checked for the followability of the label to the shaped articles and this is assessed in the following four ranks.

Very good (◎): The label followed the deformation of the shaped article and did not peel.

Good (○): The label partly peeled.

Slightly good (Δ): A half or more of the label area peeled.

Not good (×): The label peeled completely.

(2) Waterproof Adhesiveness:

The labeled in-mold shaped article (E) is dipped in water (tap water) at 40° C. for 4 days, and checked for the followability of the label to the shaped article, and this is assessed in the following four ranks.

Very good (◎): The label followed the deformation of the shaped article and did not peel.

Good (○): The label partly peeled.

Slightly good (Δ): A half or more of the label area peeled.

Not good (×): The label peeled completely.

(3) Delabelability:

The labeled in-mold shaped article (E) is dipped in hot water (tap water) at 80° C. for 15 minutes with 1.5% by weight of sodium hydroxide (by Wako Pure Chemical Industries; first class-grade chemical) dissolved therein, and checked for the peeling condition of the label, and this is assessed in the following four ranks.

Very good (⊚): The label peeled within 10 minutes, and the heat-seal layer did not remain on the shaped article.

Good (○): The label peeled within 15 minutes, and the heat-seal layer did not remain on the shaped article.

Slightly good (Δ): The label peeled, but the heat-seal layer remained on the shaped article.

Not good (×): The label did not peel.

The results of the above assessment are shown in Table 3.

In the drawings, A is a substrate layer; A-1 is the surface of a label substrate layer, B is a heat-seal layer; C is an in-mold label, D is a shaped article, E is a labeled in-mold shaped article, F is a print layer, 2 and 12 are a mold, 2-$a$ and 12-$a$ are an inner wall, 3 is a preform, 4 and 14 are a suction hole, 5 is a stretch rod, 6 is a die, 7 is a parison, 8 is an air blow nozzle.

The invention claimed is:

1. A labeled in-mold shaped article comprising:
   an in-mold label having a substrate layer that includes a thermoplastic resin and a heat-seal layer that includes a heat-seal resin and a water-soluble binder; and
   a shaped article to which the in-mold label is stuck,
   wherein the in-mold label has adhesivity to the shaped article such that the in-mold label does not peel off from the shaped article when the labeled in-mold shaped

TABLE 3

| | | Example | | | | | Comparative Example | | Example | | | | Comparative Example |
|---|---|---|---|---|---|---|---|---|---|---|---|---|---|
| | | 1 | 2 | 3 | 4 | 5 | 1 | 2 | 6 | 7 | 8 | 9 | 3 |
| Substrate Layer (Number of Production Example) | | 1 | 2 | 3 | 4 | 1 | 1 | 1 | 1 | 2 | 3 | 4 | 2 |
| Coating Composition after drying (wt. %) | Dispersion (1) | 80 | 39 | — | — | — | — | 20 | 80 | 39 | — | — | 39 |
| | Dispersion (2) | — | — | 90 | — | 50 | — | — | — | — | 90 | — | — |
| | Dispersion (3) | — | 39 | — | 82 | — | 100 | — | — | 39 | — | 82 | 39 |
| | Water-Soluble Binder (1) | 20 | — | — | — | — | — | — | 20 | — | — | — | — |
| | Water-Soluble Binder (2) | — | 10 | 5 | 3 | 45 | — | 80 | — | 10 | 5 | 3 | 10 |
| | Paper Strengthening Agent | — | 10 | 5 | 10 | 3 | — | — | — | 10 | 5 | 10 | 10 |
| | Antiblocking Agent | — | 2 | — | 5 | 2 | — | — | — | 2 | — | 5 | 2 |
| Solid Content Concentration of Coating Composition (wt. %) | | 20 | 20 | 20 | 20 | 20 | 20 | 20 | 20 | 20 | 20 | 20 | 20 |
| Drying Temperature (° C.) | | 80 | 80 | 80 | 80 | 80 | 80 | 80 | 80 | 80 | 80 | 80 | 80 |
| Dry Coating Amount (g/m²) | | 2 | 4 | 5 | 10 | 4 | 2 | 4 | 2 | 4 | 5 | 10 | 4 |
| Area Percentage (%) of Print Layer (F) | | — | — | — | — | — | — | — | 60 | 40 | 20 | 30 | 100 |
| Test Items | PET Adhesiveness | ⊚ | ⊚ | ○ | ○ | ○ | ⊚ | × | ⊚ | ⊚ | ○ | ○ | × |
| | Waterproof Adhesiveness | ⊚ | ⊚ | ○ | ○ | ○ | Δ | × | ⊚ | ⊚ | ○ | ○ | × |
| | Delabelability | ⊚ | ○ | ○ | ○ | ⊚ | Δ | ⊚ | ⊚ | ○ | ○ | ⊚ | ⊚ |
| | PP Adhesiveness | ⊚ | ⊚ | ⊚ | ⊚ | ○ | ⊚ | Δ | ⊚ | ⊚ | ○ | ○ | × |
| | Waterproof Adhesiveness | ⊚ | ⊚ | ⊚ | ○ | ○ | Δ | × | ⊚ | ⊚ | ○ | ○ | × |
| | Delabelability | ○ | ○ | ○ | ○ | ⊚ | Δ | ⊚ | ○ | ○ | ○ | ○ | ⊚ |
| | HDPE Adhesiveness | ⊚ | ⊚ | ⊚ | ⊚ | ○ | ⊚ | Δ | ⊚ | ⊚ | ○ | ○ | × |
| | Waterproof Adhesiveness | ⊚ | ⊚ | ⊚ | ○ | ○ | Δ | × | ⊚ | ⊚ | ○ | ○ | × |
| | Delabelability | ○ | ○ | ○ | ○ | ⊚ | Δ | ⊚ | ○ | ○ | ○ | ○ | ⊚ |

Industrial Applicability

The in-mold label of the invention may readily produce a labeled in-mold shaped article that is excellent both in the label adhesiveness to the shaped article and in the delabelability. The labeled in-mold shaped article of the invention is utilizable in various fields as containers for beverages, liquors, soy sauces, oils, detergents, etc., and its applicability range is extremely broad. After used, the label may be readily separated from the container, and the article has good recyclability, and therefore, the demand for it may increase.

Figure 1:
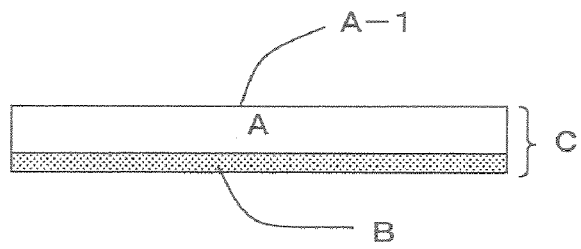
FIG. 1 It is a cross-sectional view of one embodiment of the in-mold label of the invention.
Figure 2:
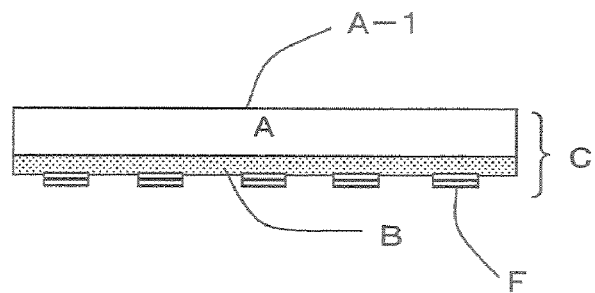
FIG. 2 It is a cross-sectional view of another embodiment of the in-mold label of the invention.
Figure 3:
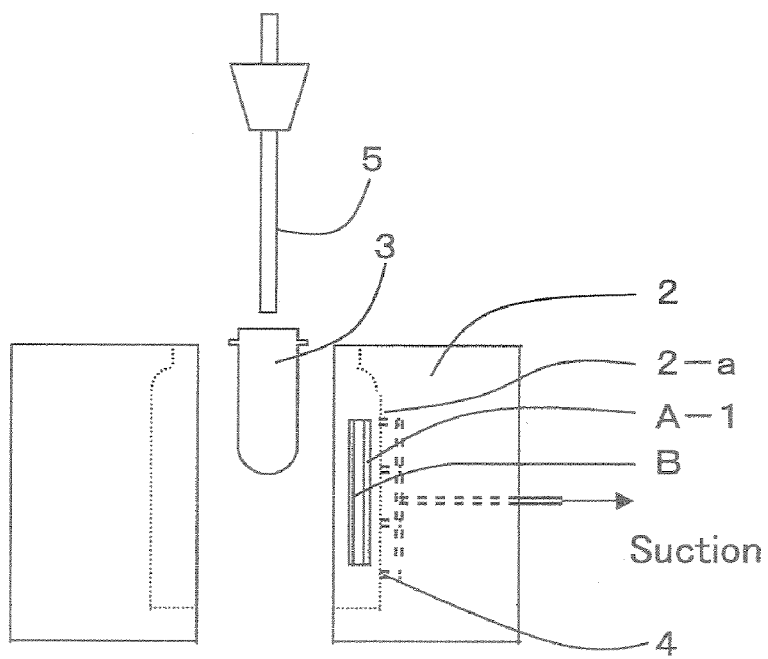
FIG. 3 It is a cross-sectional view of a molding machine for in-mold production of labeled PET bottles.
Figure 4:
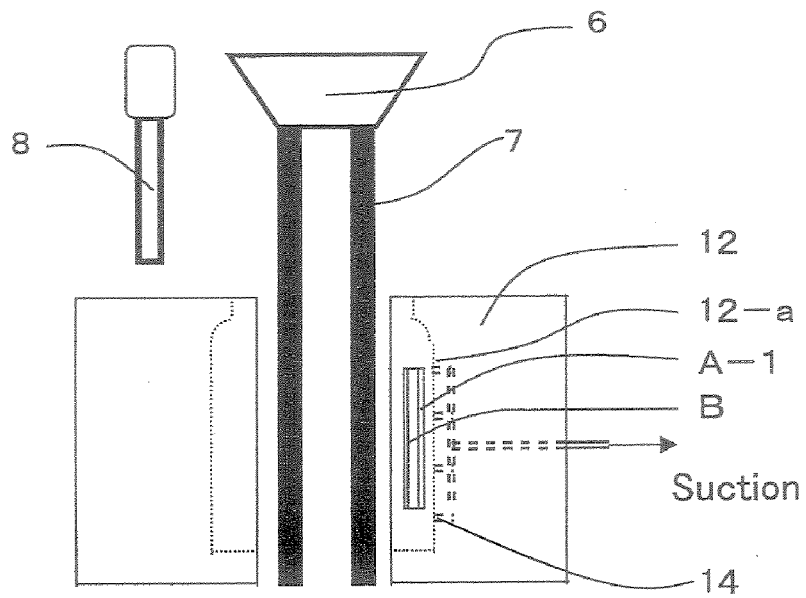
FIG. 4 It is a cross-sectional view of a molding machine for in-mold production of labeled polypropylene bottles or polyethylene bottles.
Figure 5:
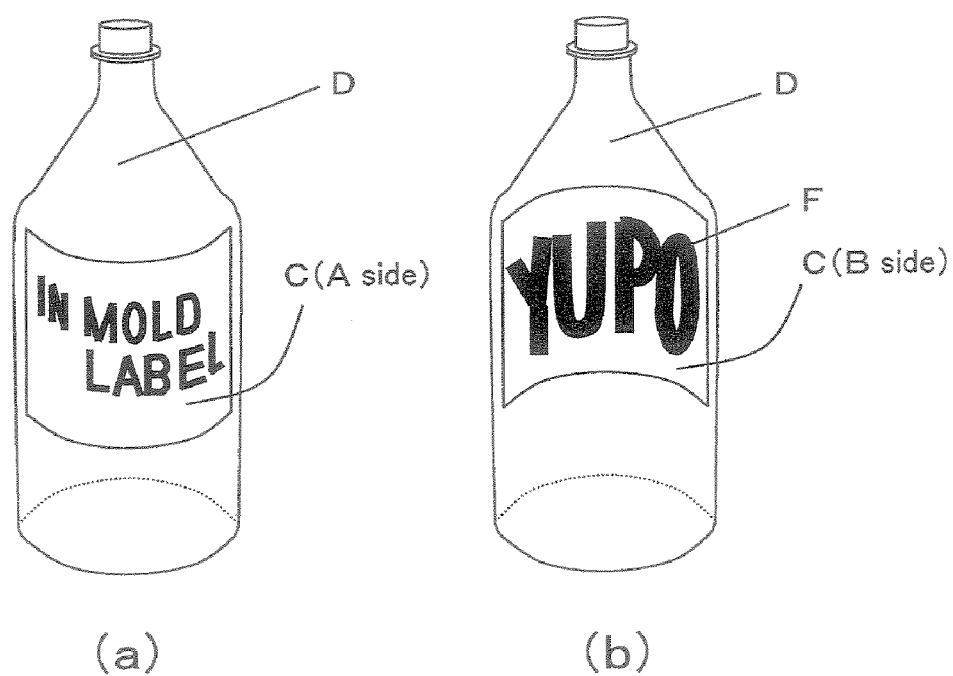
FIG. 5 it shows outline views of one embodiment of the labeled in-mold shaped article of the invention. (a) is a perspective front view; and (b) is a perspective back view.

article is dipped in water at 40° C. for 4 days, and the water-soluble binder comprises at least one substance selected from the group consisting of an ethyleneimine-based polymer, polyacrylamide, polyvinylacetamide, a dicyandiamide-based condensate, an epichlo-dimethylamine condensate, a dimethylamine-ethylene chloride condensate, aminomethyl-based polyacrylamide, polyvinylamine, polyvinylimidazoline, polyvinylbenzyltrimethylammonium chloride, and a polyvinylacetamide-vinylamine copolymer.

2. The labeled in-mold shaped article according to claim 1, wherein the in-mold label comprises the substrate layer, the heat-seal layer, and a print layer in that order, and the print layer has a print area of from 1 to 90% of a whole label.

3. The labeled in-mold shaped article according to claim 2, wherein the print area of the print layer is from 5 to 80% of the whole label.

4. The labeled in-mold shaped article according to claim 1, wherein the in-mold label peels off from the shaped article and the heat-seal layer does not remain on the shaped article when the article is dipped in an aqueous 1.5 wt. % sodium hydroxide solution at 80° C. for 15 minutes.

5. The labeled in-mold shaped article according to claim 1, wherein the water-soluble binder comprises a cationic water-soluble binder.

6. The labeled in-mold shaped article according to claim 1, wherein the heat-seal layer is formed by applying a water-based coating composition that includes a heat-seal resin and a water-soluble binder, onto the substrate layer, and drying the water-based coating composition thereon.

7. The labeled in-mold shaped article according to claim 1, wherein the heat-seal layer includes the heat-seal resin comprising from 30 to 99% by weight of a thermoplastic resin having a melting point of from 50 to 120° C., and the heat-seal layer includes from 1 to 70% by weight of the water-soluble binder.

8. The labeled in-mold shaped article according to claim 1, wherein the substrate layer has a density of from 0.40 to 0.98 g/cm$^3$.

9. The labeled in-mold shaped article according to claim 1, wherein the thermoplastic resin of the substrate layer comprises polyolefin.

10. The labeled in-mold shaped article according to claim 1, wherein the shaped article is formed by one of an injection-molding method, a direct-blow molding method, an injection-blow molding method, a stretch-blow molding method, a thermoforming method and a compression molding method.

11. The labeled in-mold shaped article according to claim 1, wherein the shaped article comprises a material selected from the group consisting of polyethylene, polypropylene, polyvinyl chloride, polyethylene terephthalate, polybutylene terephthalate, polyethylene naphthalate, polyamide, polycarbonate and polystyrene.

12. An in-mold label which comprises:
   a substrate layer that includes a thermoplastic resin; and
   a heat-seal layer that includes a heat-seal resin and a water-soluble binder,
   wherein the in-mold label is configured such that, when an labeled in-mold shaped article having the in-mold label stuck to a shaped article is dipped in water at 40° C. for 4 days, the in-mold label does not peel off from the shaped article, and the water-soluble binder comprises at least one substance selected from the group consisting of an ethyleneimine-based polymer, polyacrylamide, polyvinylacetamide, a dicyandiamide-based condensate, an epichlo-dimethylamine condensate, a dimethylamine-ethylene chloride condensate, aminomethyl-based polyacrylamide, polyvinylamine, polyvinylimidazoline, polyvinylbenzyltrimethylammonium chloride, and a polyvinylacetamide-vinylamine copolymer.

13. The in-mold label according to claim 12, wherein the substrate layer, the heat-seal layer, and a print layer are provided in that order, and the print layer has a print area of from 1 to 90% of a whole label.

14. The in-mold label according to claim 13, wherein the print area of the print layer is from 5 to 80% of the whole label.

15. The in-mold label according to claim 12, wherein the in-mold label peels off from the shaped article and the heat-seal layer does not remain on the shaped article when the labeled in-mold shaped article is dipped in an aqueous 1.5 wt. % sodium hydroxide solution at 80° C. for 15 minutes.

16. The in-mold label according to claim 12, wherein the heat-seal layer includes the heat-seal resin comprising from 30 to 99% by weight of a thermoplastic resin having a melting point of from 50 to 120° C., and the heat-seal layer includes from 1 to 70% by weight of the water-soluble binder.

17. The in-mold label according to claim 12, wherein the water-soluble binder comprises a cationic water-soluble binder.

18. The in-mold label according to claim 12, wherein the substrate layer has a density of from 0.40 to 0.98 g/cm$^3$.

19. The in-mold label according to claim 12, wherein the thermoplastic resin of the substrate layer comprises polyolefin.

20. The in-mold label according to claim 12, wherein the heat-seal layer is formed by applying a water-based coating composition onto the substrate layer and drying the water-based coating composition thereon.

21. The in-mold label according to claim 12, wherein the shaped article comprises a material selected from the group consisting of polyethylene, polypropylene, polyvinyl chloride, polyethylene terephthalate, polybutylene terephthalate, polyethylene naphthalate, polyamide and polystyrene.

22. The labeled in-mold shaped article according to claim 1, wherein the water-soluble binder is an ethyleneimine-based polymer.

23. A labeled in-mold shaped article comprising:
   an in-mold label having a substrate layer that includes a thermoplastic resin and a heat-seal layer that includes a heat-seal resin and a water-soluble binder; and
   a shaped article to which the in-mold label is stuck,
   wherein the in-mold label has adhesivity to the shaped article such that the in-mold label does not peel off from the shaped article when the labeled in-mold shaped article is dipped in water at 40° C. for 4 days, and the water-soluble binder comprises a natural substance-derived binder, and the natural substance-derived binder is at least one substance selected from the group consisting of starch, modified starch, carboxymethyl cellulose, hydroxyethyl cellulose, hydroxypropyl cellulose, gelatin, pullulan, alginic acid, guar gum, locust bean gum, xanthane gum, pectin, carrageenan, gum arabic, gum ghatti, Kuraya gum, tragacanth gum, Psyllium sead gum, soybean polysaccharides, tamarind seed gum, tara gum, agar, furcelleran, glucomannan, microcrystalline cellulose, welan gum, curdlane, gellan gum, dextran, xanthane gum, chitin, and chitosan.

24. The in-mold label according to claim 12, wherein the water-soluble binder is an ethyleneimine-based polymer.

* * * * *